(12) United States Patent
Watson et al.

(10) Patent No.: US 11,349,699 B2
(45) Date of Patent: May 31, 2022

(54) SPECULATIVE PRE-AUTHORIZATION OF ENCRYPTED DATA STREAMS

(71) Applicant: NETFLIX, Inc, Los Gatos, CA (US)

(72) Inventors: Mark Watson, San Francisco, CA (US); Anthony Neal Park, San Jose, CA (US); Wei Wei, Fremont, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 13/838,059

(22) Filed: Mar. 15, 2013

(65) Prior Publication Data

US 2014/0052873 A1   Feb. 20, 2014

Related U.S. Application Data

(60) Provisional application No. 61/683,187, filed on Aug. 14, 2012.

(51) Int. Cl.
*H04L 29/06* (2006.01)
*G06F 21/10* (2013.01)
*H04L 65/60* (2022.01)

(52) U.S. Cl.
CPC ........ *H04L 29/06476* (2013.01); *G06F 21/10* (2013.01); *H04L 2209/603* (2013.01)

(58) Field of Classification Search
CPC ........... H04L 29/06476; H04L 41/0213; H04L 29/06; H04L 29/06523; H04L 29/08072; H04L 2209/603; G06F 21/10
USPC ......................................................... 709/231
See application file for complete search history.

(56) References Cited

U.S. PATENT DOCUMENTS

| | | | | |
|---|---|---|---|---|
| 5,303,303 A * | 4/1994 | White | ..................... | H04L 29/06 713/160 |
| 5,953,506 A * | 9/1999 | Kalra et al. | ................... | 709/231 |
| 6,026,164 A * | 2/2000 | Sakamoto | ............ | H04N 7/1675 348/E7.056 |
| 6,269,394 B1 * | 7/2001 | Kenner et al. | ................ | 709/217 |
| 6,351,538 B1 * | 2/2002 | Uz | ......................... | H04N 5/913 348/E7.056 |
| 6,487,663 B1 * | 11/2002 | Jaisimha et al. | .............. | 713/193 |
| 6,898,285 B1 * | 5/2005 | Hutchings et al. | ........... | 380/200 |
| 6,934,752 B1 * | 8/2005 | Gubbi | .......................... | 709/225 |
| 7,039,938 B2 * | 5/2006 | Candelore | .......... | H04N 21/2347 380/211 |

(Continued)

OTHER PUBLICATIONS

Extended European Search Report for Application No. 13180103.7 dated Mar. 29, 2017, 7 pages.

*Primary Examiner* — Nicholas P Celani
(74) *Attorney, Agent, or Firm* — Artegis Law Group, LLP

(57) ABSTRACT

Techniques are disclosed for improving user experience of multimedia streaming over computer networks. For example, a method for presenting multimedia content may generally include receiving a request to stream a media title. In response to the request, unencrypted content for the media title is streamed to a client. While streaming the unencrypted content, a digital rights management (DRM) license to access encrypted content for the media title is requested. After receiving the DRM license, the client switches from streaming the unencrypted content for the media title to streaming encrypted content for the media title. The switching from streaming the unencrypted content to streaming the encrypted content does not interrupt playback of the media title.

14 Claims, 6 Drawing Sheets

(56) References Cited

U.S. PATENT DOCUMENTS

| | | | | |
|---|---|---|---|---|
| 7,120,250 B2* | 10/2006 | Candelore | H04N 5/783 | 348/E7.056 |
| 7,242,773 B2* | 7/2007 | Candelore | H04N 5/783 | 348/E7.056 |
| 7,343,013 B2* | 3/2008 | Pedlow, Jr. | H04N 7/163 | 380/239 |
| 7,555,464 B2* | 6/2009 | Candelore | G06Q 20/3829 | 705/50 |
| 7,577,714 B2* | 8/2009 | Saunders et al. | 709/213 | |
| 7,620,185 B2* | 11/2009 | Lahtinen | H04H 60/23 | 380/276 |
| 7,802,277 B2* | 9/2010 | Medford | H04N 21/23476 | 380/200 |
| 7,978,848 B2* | 7/2011 | Zhu | H04L 63/065 | 380/44 |
| 8,098,817 B2* | 1/2012 | Aslam | H04N 7/1675 | 380/200 |
| 8,185,650 B2* | 5/2012 | Lau et al. | 709/231 | |
| 8,200,772 B2* | 6/2012 | Saunders | H04L 29/06 | 709/213 |
| 8,255,547 B2* | 8/2012 | Schlacht | H04N 7/162 | 380/210 |
| 8,532,292 B2* | 9/2013 | Fukushima | H04N 7/1675 | 380/234 |
| 8,700,897 B2* | 4/2014 | Peng | H04L 9/0866 | 713/165 |
| 8,739,304 B2* | 5/2014 | Mallinson | G06F 21/10 | 726/13 |
| 8,751,800 B1* | 6/2014 | Dorwin | G06F 21/6209 | 380/277 |
| 8,893,302 B2* | 11/2014 | Abu-Amara | G06F 21/10 | 380/201 |
| 9,088,550 B1* | 7/2015 | Taraki | H04L 63/0457 | |
| 10,102,351 B2* | 10/2018 | Zweig | G06F 21/10 | |
| 10,212,460 B1* | 2/2019 | Dorwin | G06F 21/62 | |
| 2002/0170053 A1* | 11/2002 | Peterka | H04N 21/4627 | 725/31 |
| 2003/0131353 A1* | 7/2003 | Blom | H04L 63/0428 | 725/25 |
| 2004/0028227 A1* | 2/2004 | Yu | H04L 63/0428 | 380/201 |
| 2004/0193550 A1* | 9/2004 | Siegel | G06Q 30/02 | 705/67 |
| 2005/0169473 A1* | 8/2005 | Candelore | A01K 11/008 | 380/239 |
| 2005/0238316 A1* | 10/2005 | MacDonald Boyce | G11B 27/105 | 386/330 |
| 2005/0259813 A1* | 11/2005 | Wasilewski | H04H 20/78 | 380/28 |
| 2006/0059090 A1* | 3/2006 | Lahtinen | H04H 60/23 | 705/50 |
| 2006/0107285 A1* | 5/2006 | Medvinsky | H04N 7/1675 | 725/25 |
| 2006/0212943 A1* | 9/2006 | Kitazato | G06F 21/10 | 726/26 |
| 2007/0005795 A1* | 1/2007 | Gonzalez | 709/232 | |
| 2007/0043667 A1* | 2/2007 | Qawami | G06F 21/10 | 705/50 |
| 2007/0130068 A1* | 6/2007 | Kitazato | H04N 21/2541 | 705/50 |
| 2007/0233602 A1 | 10/2007 | Zweig et al. | | |
| 2008/0115229 A1* | 5/2008 | Mallinson | G06F 21/10 | 726/30 |
| 2009/0150409 A1* | 6/2009 | Watson | H04N 5/76 | |
| 2009/0304115 A1* | 12/2009 | Pittaway | H04H 60/14 | 375/340 |
| 2010/0281179 A1* | 11/2010 | Istavan et al. | 709/231 | |
| 2010/0325417 A1* | 12/2010 | Swenson | H04L 9/3263 | 713/150 |
| 2011/0093900 A1* | 4/2011 | Patel | H04N 21/2343 | 725/54 |
| 2011/0265150 A1* | 10/2011 | Spooner | H04N 21/2541 | 726/4 |
| 2012/0005041 A1* | 1/2012 | Mehta et al. | 705/27.1 | |
| 2012/0005401 A1* | 1/2012 | Anand | G06F 9/45558 | 711/6 |
| 2012/0079578 A1* | 3/2012 | Dachiraju | H04N 21/2225 | 726/7 |
| 2012/0084454 A1* | 4/2012 | Lindquist | H04N 21/8456 | 709/231 |
| 2012/0281965 A1* | 11/2012 | Hunt | H04N 5/76 | 386/241 |
| 2012/0331167 A1* | 12/2012 | Hunt | G06F 21/10 | 709/231 |
| 2013/0042271 A1* | 2/2013 | Yellin | H04N 5/765 | 725/41 |
| 2013/0160146 A1* | 6/2013 | Kaiser | H04N 21/2541 | 726/30 |
| 2013/0173919 A1* | 7/2013 | Jogand-Coulomb | H04L 63/062 | 713/168 |

* cited by examiner

SPECULATIVE PRE-AUTHORIZATION OF ENCRYPTED DATA STREAMS

CROSS-REFERENCE TO RELATED APPLICATIONS

This application claims benefit of U.S. provisional patent application Ser. No. 61/683,187, filed Aug. 14, 2012, which is herein incorporated by reference.

BACKGROUND OF THE INVENTION

1. Field of the Invention

Embodiments presented in this disclosure generally relate to streaming media services. More specifically, embodiments presented herein relate to techniques for speculatively pre-authorizing encrypted data streams.

2. Description of the Related Art

Digital content distribution systems conventionally include a content server, a content player, and a communications network connecting the content server to the content player. The content server is configured to store digital content files, which can be downloaded from the content server to the content player. Each digital content file corresponds to a specific identifying title, such as "Gone with the Wind," which is familiar to a user. The digital content file typically includes sequential content data, organized according to playback chronology, and may comprise audio data, video data, or a combination thereof.

The digital content distribution system may implement various access control technologies such as digital rights management (DRM). DRM is an access control technology that limits or inhibits the use or playback of digital content. For example, the digital content file may be restricted to be played back on only certain authorized devices. DRM may be implemented using data encryption techniques that require the user to obtain a license to be able to decrypt the digital media content.

Prior to initiating playback of digital content files, the content player may be required to perform a series of steps, such as requesting metadata, requesting location data for the content files, and obtaining a DRM license for playback of DRM protected data. These requests may take a significant amount of time, thereby delaying the beginning of playback of the digital content file.

As the foregoing illustrates, what is needed in the art is an approach for downloading digital content files to a content player that provides a higher quality playback experience than prior art approaches.

SUMMARY

One embodiment of the invention includes a method for presenting multimedia content. This method may generally include receiving a request to stream a media title. In response to the request, unencrypted content for the media title is streamed to a client. While streaming the unencrypted content, a digital rights management (DRM) license to access encrypted content for the media title is requested. After receiving the DRM license, the client switches from streaming the unencrypted content for the media title to streaming encrypted content for the media title. The switching from streaming the unencrypted content to streaming the encrypted content does not interrupt playback of the media title.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for early playback of streaming digital media content. One embodiment provides a streaming media server that stores encrypted and unencrypted content, and an endpoint device configured to playback unencrypted content, prior to the endpoint device receiving information for playing back the encrypted content. The information for playing back the encrypted content may include a digital rights management (DRM) license, including a key for decrypting the encrypted content, and metadata for the encrypted content. Upon receiving a user request to play a digital media content title, the endpoint device generates a request for metadata for unencrypted content. The endpoint device then receives the metadata, which includes location information for unencrypted content. The endpoint device retrieves the unencrypted content and starts playing the unencrypted content for the user. While the unencrypted content is playing, the endpoint device requests metadata for the encrypted content and a DRM license. When the endpoint device receives the metadata and DRM license, the endpoint device requests the encrypted content. Note that while the endpoint device may wait until receiving the DRM license to begin downloading the encrypted content, the endpoint device may also begin downloading the encrypted content (without decrypting it) prior to receiving the license from the DRM server. Advantageously, the perceived (and actual) delay between the time a user requests to play a digital media content title and the time playback of the digital media content title commences may be reduced in some cases.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
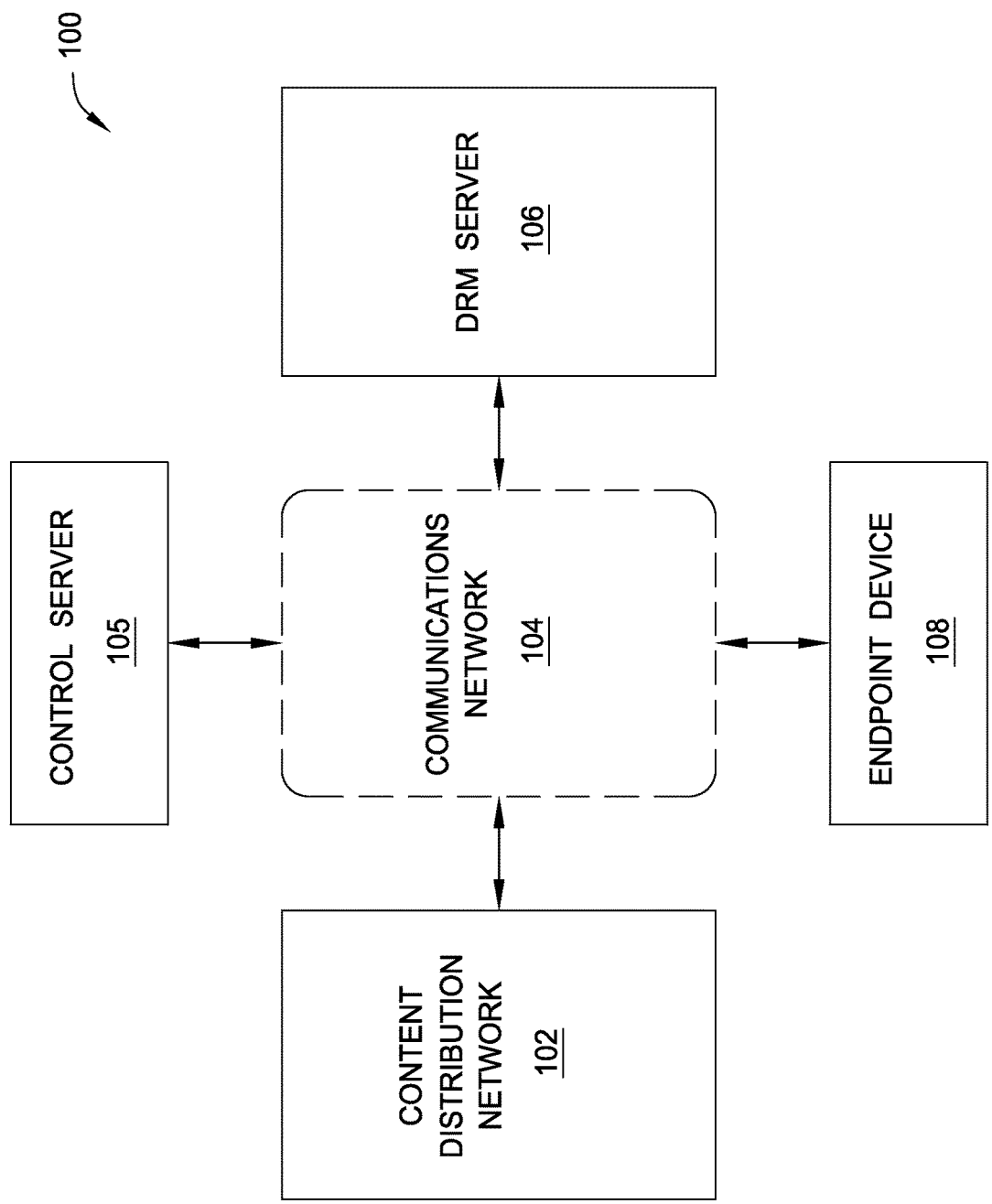
FIG. 1 illustrates a content distribution system configured to implement one or more embodiments presented in this disclosure.

FIG. 1 is a block diagram illustrating a content distribution system 100 configured to implement one or more embodiments presented in this disclosure. As shown, the content distribution system 100 includes a content distribution network (CDN) 102, a communications network 104, a control server 105, a digital rights management (DRM) server 106 and an endpoint device 108.

In one embodiment, the communications network 104 includes a plurality of network communications systems, such as routers and switches, configured to facilitate data communication between the CDN 102, the control server 105, the DRM server 106 and the endpoint device 108. Persons skilled in the art will recognize that many technically feasible techniques exist for building the communications network 104, including technologies practiced in deploying the well-known internet communications network 104.

In one embodiment, the endpoint device 108 may be a computer system, a set top box, a mobile device such as a mobile phone, or any other technically feasible computing platform that has network connectivity and is coupled to or includes a display device and speaker device for presenting video frames and generating acoustic output.

In one embodiment, the CDN 102 includes one or more computer systems configured to serve download requests for digital content files received from the endpoint device 108. The digital content files may reside on a mass storage system accessible to the computer system. The mass storage system may include, without limitation, direct attached storage, network attached file storage, or network attached block-level storage. The digital content files may be formatted and stored on the mass storage system using any technically feasible technique. A data transfer protocol, such as the well-known hyper-text transfer protocol (HTTP), may be used to download digital content files from the CDN 102 to the endpoint device 108. In some embodiments, the content files include a number of chunks, where each chunk has information for a certain portion of video and audio data for a media title. For example, every chunk may include data for a two-second portion of video and audio data for a media title. In some embodiments, all chunks are of uniform duration.

In some embodiments, the control server 105 serves requests for metadata associated with digital content files. The metadata is used for requesting digital content and for requesting a license authorizing playback of a digital content file. In one embodiment, prior to transmitting metadata in response to a request for metadata, the control server 105 may perform checks to determine that a user has authorization to play the digital content file. The checks may include, for example, a check for whether the content player is out of window, a check for whether the number of streams currently being sent to the user exceeds a certain limit, a check for whether the user has paid their account, and other checks.

In some embodiments, the metadata includes one or more indications of locations of digital content files. In some embodiments, the one or more indications of locations of digital content files may include alternative locations of digital content files should one or more digital content files not be reachable. In some embodiments, locations may be expressed as a Uniform Resource Identifier (URI). In some embodiments, the metadata includes a stream header. In some embodiments, stream headers include indications of locations of chunks in the content files. In some embodiments, the metadata includes a DRM header. The DRM header includes information for obtaining a DRM license from DRM server 106.

In some embodiments, the metadata includes media attributes. Some examples of media attributes include a resolution or bit rate of a digital content file, a number of audio channels associated with the digital content file, subtitle information associated with the digital content file, audio tracks associated with the digital content file, an aspect ratio of the digital content file, and a codec associated with the digital content file.

In some embodiments, the DRM server 106 serves requests for licenses associated with encrypted digital content files received from the endpoint device 108. In operation, encrypted digital content downloaded from the CDN 102 by the endpoint device 108 must be decrypted before the digital content file can be played. The DRM server 106 transmits the license associated with the encrypted digital content to the endpoint device 108, which in turn uses a key included in the license to decrypt the digital content file. In some embodiments, each key is generated on-the-fly for each session, to authorize the endpoint device 108 to stream a media title. In other embodiments the key with which the file has been encrypted is retrieved from a database on the server side and then packaged in the license. In such embodiments, the key may be provided to the endpoint device 108 upon receiving valid credentials (e.g., a user name and a password) from the endpoint device 108. Further, in some embodiments, some or all of the functionality of the DRM server 106 may be integrated into the control server 105.

Although embodiments described herein are described with reference to the control server 105 providing both the stream header and the DRM header, other embodiments are broadly contemplated. For example, in an alternative embodiment, DRM headers are stored as part of the digital content files in the CDN 102, rather than on the control server 105. In such embodiments, the control server 105 serves requests for metadata, and the CDN 102 serves requests for stream headers, including DRM headers.

Although, in the above description, the content distribution system 100 is shown with one endpoint device 108 and one CDN 102, persons skilled in the art will recognize that the architecture of FIG. 1 may typically support a large number of endpoint devices 108 as well as multiple CDNs 102. Thus, FIG. 1 is not intended to limit the scope of the present invention.

Figure 2:
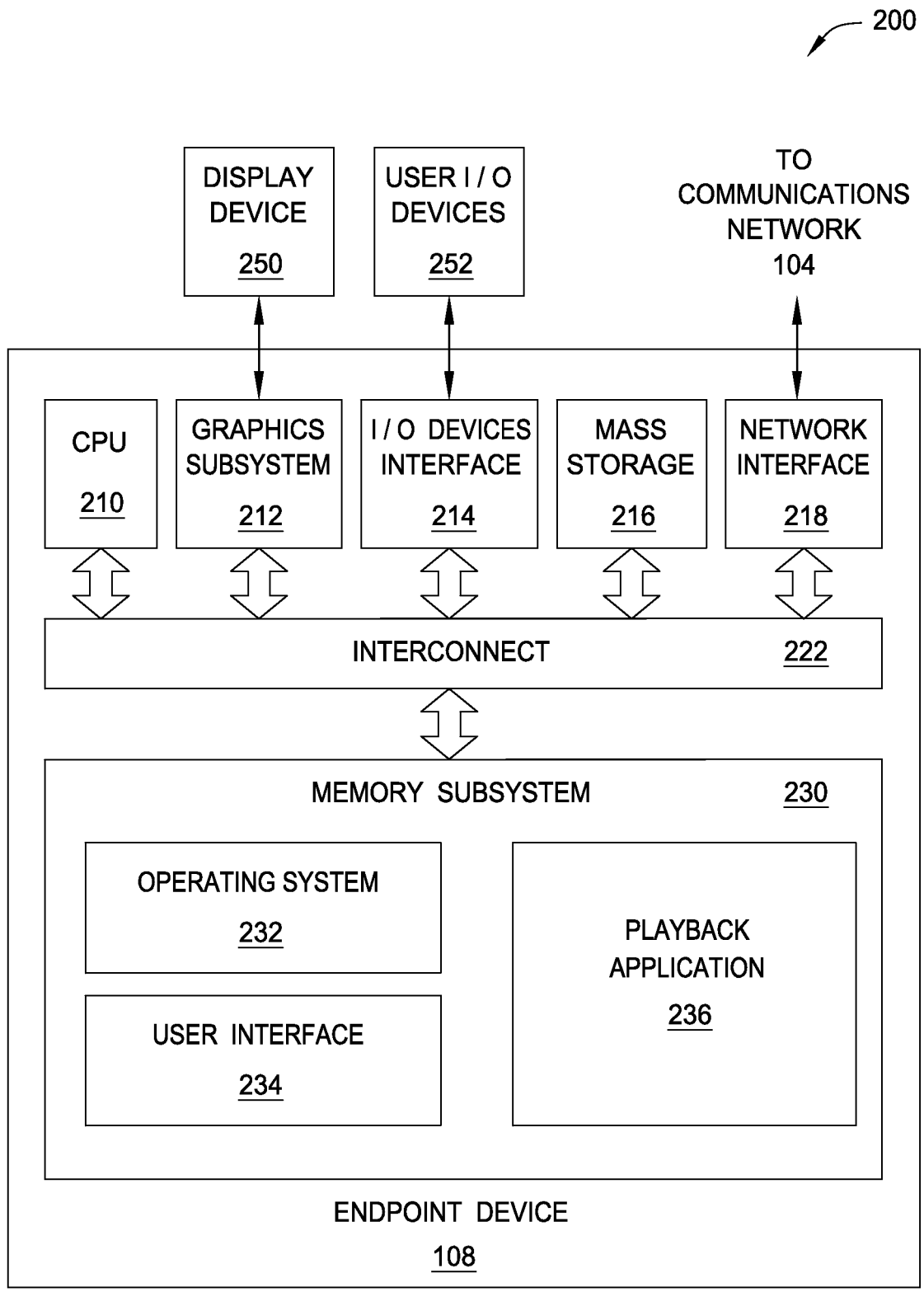
FIG. 2 is a block diagram illustrating components of the endpoint device of FIG. 1, according to one embodiment of the present invention.

FIG. 2 is a block diagram illustrating components of the endpoint device 108 of FIG. 1, according to one embodiment of the present invention. As shown, the components 200 include, without limitation, a central processing unit (CPU) 210, a graphics subsystem 212, an input/output (I/O) device interface 214, a mass storage unit 216, a network interface 218, an interconnect 222, and a memory subsystem 230. Depending on the embodiment, the endpoint device may be, without limitation, a conventional computing system, e.g., a desktop PC, a laptop computer, or home theatre PC (HTPC), or any of a variety of end-user client devices, including, e.g., mobile telephones, tablet and net-book computing devices, console and handheld video game systems, digital video recorders (DVRs), DVD players, connected digital TVs, and dedicated media streaming devices, (e.g., the Roku® set-top box), etc.

In some embodiments, the CPU 210 is configured to retrieve and execute programming instructions stored in the memory subsystem 230. Similarly, the CPU 210 is configured to store and retrieve application data residing in the memory subsystem 230. The interconnect 222 is configured to facilitate transmission of data, such as programming instructions and application data, between the CPU 210, graphics subsystem 212, I/O devices interface 214, mass storage 216, network interface 218 and memory subsystem 230.

In some embodiments, the graphics subsystem 212 is configured to generate frames of video data and transmit the frames of video data to display device 250. In some embodiments, the graphics subsystem 212 may be integrated into an integrated circuit, along with the CPU 210. The display device 250 may comprise any technically feasible means for generating an image for display. For example, the display device 250 may be fabricated using liquid crystal display (LCD) technology, cathode-ray technology, and light-emitting diode (LED) display technology (either organic or inorganic). An input/output (I/O) device interface 214 is configured to receive input data from user I/O devices 252 and transmit the input data to the CPU 210 via the interconnect 222. For example, user I/O devices 252 may comprise one of more buttons, a keyboard, and a mouse or other pointing device. The I/O device interface 214 also includes an audio output unit configured to generate an electrical audio output signal. User I/O devices 252 includes a speaker configured to generate an acoustic output in response to the electrical audio output signal. In alternative embodiments, the display device 250 may include the speaker. A television is an example of a device known in the art that can display video frames and generate an acoustic output. A mass storage unit 216, such as a hard disk drive or flash memory storage drive, is configured to store non-volatile data. A network interface 218 is configured to transmit and receive packets of data via the communications network 104. In some embodiments, the network interface 218 is configured to communicate using the well-known Ethernet standard. The network interface 218 is coupled to the CPU 210 via the interconnect 222.

In some embodiments, the memory subsystem 230 includes programming instructions and data that comprise an operating system 232, a user interface 234 and a playback application 236. The operating system 232 performs system management functions such as managing hardware devices including the network interface 218, mass storage unit 216, I/O device interface 214, and graphics subsystem 212. The operating system 232 also provides process and memory management models for the user interface 234 and the playback application 236. The user interface 234, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 236 is configured to retrieve encrypted digital content from the CDN 102 via the network interface 218. The playback application 236 may also decrypt and render the retrieved digital content. In operation, the playback application 236 first retrieves, from the control server 105, metadata associated with a digital content file to be played from the CDN 102. As described above, the metadata may include the stream header and/or the DRM header associated with the digital content. Based on the retrieved metadata, the playback application 236 generates a request for a DRM license. The playback application 236 then sends the generated request to the DRM server 106.

As described above, in some embodiments, upon receiving the request for a DRM license, the DRM server 106 transmits a DRM license associated with the digital content to be played to the playback application 236. The DRM license includes the decryption key needed to decrypt the encrypted digital content. At the same time (or after receiving the DRM license) the playback application 236 retrieves encrypted content. Upon receipt, the playback application 236 decrypts and renders the retrieved digital content, based on the DRM license. In some embodiments, the DRM license may also include a key used to create a session key and may include a cryptographic token to be presented to the CDN 102, authorizing the endpoint device 108 to receive the encrypted media title from the CDN 102.

Figure 3:
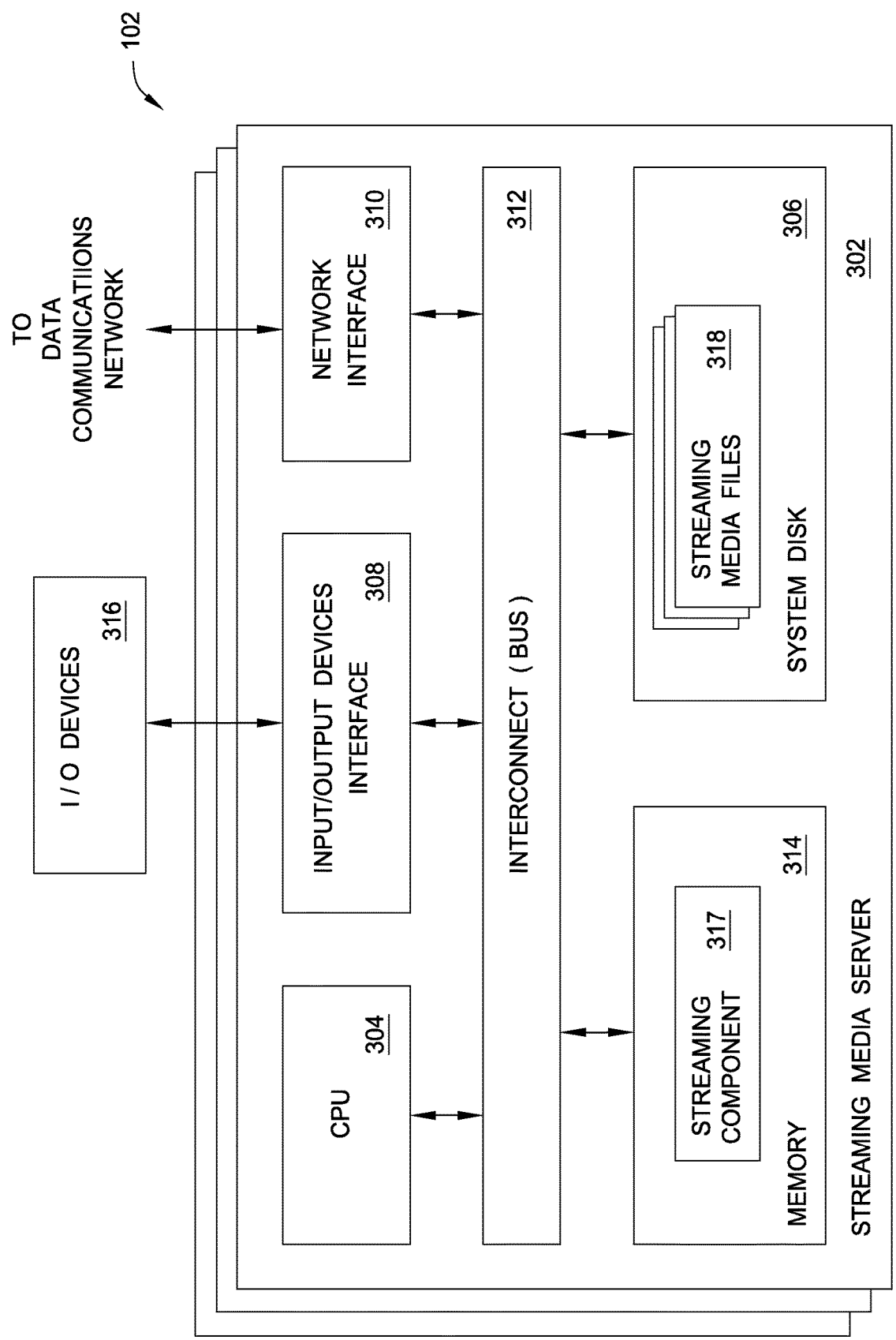
FIG. 3 is a block diagram illustrating components of the content distribution network of FIG. 1, according to one embodiment of the present invention.

FIG. 3 is a block diagram illustrating components of the content distribution network 102 of FIG. 1, according to one embodiment of the present invention. As shown, the content distribution network 102 includes a number of streaming media servers 302, which include a central processing unit (CPU) 304, a system disk 306, an input/output (I/O) devices interface 308, a network interface 310, an interconnect 312, and a system memory 314.

The CPU 304 is configured to retrieve and execute programming instructions stored in the system memory 314. Similarly, the CPU 304 is configured to store application data and retrieve application data from the system memory 314. The interconnect 312 is configured to facilitate transmission of data, such as programming instructions and application data, between the CPU 304, the system disk 306, I/O devices interface 308, the network interface 310, and the system memory 314. The I/O devices interface 308 is configured to receive input data from I/O devices 316 and transmit the input data to the CPU 304 via the interconnect 312. For example, I/O devices 316 may include one or more buttons, a keyboard, and a mouse or other pointing device. The I/O devices interface 308 is also configured to receive output data from the CPU 304 via the interconnect 312 and transmit the output data to the I/O devices 316. The system disk 306, such as a hard disk drive or flash memory storage drive or the like, is configured to store non-volatile data such as encoded video streams. The encoded video streams can then be retrieved by the endpoint device 108 via the communications network 104. In some embodiments, the network interface 310 is configured to operate in compliance with the well-known Ethernet standard.

The system memory 314 includes a software streaming component 317 that include instructions for serving requests for video content. When streaming component 317 receives a request for video content, streaming component 317 accesses a corresponding content file in the system disk 306 and transmits the content file through communications network 104 to endpoint device 108. The system disk 306 includes one or more streaming media files 318. Streaming media files 318 include content data for media titles such as video and audio data. The system disk 306 may include more than one streaming media file 318 for each media title. For example, each media title may have multiple corresponding streaming media files 318, where each media file encodes the content data at a different bitrate.

Speculative Pre-Authorization of Encrypted Data Streams

Referring to FIGS. 1-3 together, in some embodiments, the content distribution system 100 is configured to begin playback of a media title for a user prior to the endpoint device 108 receiving all necessary information for playing encrypted content. Accordingly, streaming media servers 302 within CDN 102 store some unencrypted content in streaming media files 318 in system disk 306. Streaming media servers 302 are configured to stream the unencrypted content to endpoint device 108 prior to the endpoint device 108 receiving information, such as a DRM license, for playing encrypted content. Endpoint device 108 is configured to play the unencrypted content without a decryption key within a DRM license. While the endpoint device 108 is playing the unencrypted content, the endpoint device 108 is configured to request, from the control server 105 and the DRM server 106, information for playback of encrypted content, such as location data for encrypted content, and a DRM license for decrypting the encrypted content.

Streaming media server 302 is thus configured to store both encrypted content and unencrypted content for at least one media title. In some embodiments, streaming media server 302 stores encrypted and unencrypted content for a portion of the media titles, or for all media titles stored in streaming media server 302. In some embodiments, the unencrypted content represents only an initial portion of data for a media title (e.g., only the first two minutes of data for a media title). Because the unencrypted content is only a portion of data for a media title, the user cannot view all of the content for the media title without obtaining a DRM license. In some embodiments, the unencrypted content may be of lower video and/or audio quality than the encrypted content.

In some embodiments, each media title may have multiple corresponding streaming media files 318. In some embodiments, decrypted content and encrypted content may be stored in separate files on a streaming media server 302 within CDN 102. In some embodiments, decrypted content and encrypted content may be stored in a single file (a "consolidated file") on a streaming media server 302 within CDN 102. In some embodiments, a consolidated file may include an initial portion of unencrypted data and a final portion of encrypted data. In other embodiments, a consolidated file may include an initial portion of unencrypted data as well as interleaved portions of encrypted and unencrypted data. In such embodiments, the portions of unencrypted data may correspond to starting points for specific scenes, chapters, or other divisions of a media title.

When a user selects a media title for playback, endpoint device 108 requests metadata for the media title from the control server 105, which includes, for example, the location data for one or more content files including unencrypted content within CDN 102. Endpoint device 108 requests download of content files in CDN 102 by transmitting a request to CDN 102 with the location data. In some embodiments, endpoint device 108 may initially (i.e., prior to requesting unencrypted data) request only metadata for unencrypted files. In other embodiments, endpoint device 108 may request metadata for both unencrypted files and encrypted files, or for consolidated files.

To play back unencrypted data, endpoint device 108 requests download of content files in CDN 102 by transmitting a request to CDN 102 with location data for a content file that includes unencrypted content. Endpoint device 108 also transmits a request to DRM server 106 for a DRM license to decrypt and play encrypted content. In some embodiments, e.g., when encrypted content and unencrypted content are in separate files, endpoint device 108 may also transmit a request to control server 105 for metadata for files including encrypted content.

When endpoint device 108 receives unencrypted content, endpoint device 108 begins playing the unencrypted content for a user. Because endpoint device 108 need not wait to receive all information for playing encrypted content (such as metadata for encrypted content files and a DRM license), endpoint device 108 may begin playing unencrypted content prior to obtaining or requesting the information for playing encrypted content. Once endpoint device 108 receives the DRM license, endpoint device 108 may begin decrypting and playing back the decrypted content immediately, or after a certain period of time. In some embodiments, endpoint device 108 may provide an uninterrupted transition from unencrypted content to encrypted content by switching from decoding and playing the unencrypted content to decrypting and playing the encrypted content. Endpoint device 108 may begin downloading the encrypted content before or after receiving the DRM license.

In some embodiments, encrypted content may be stored at a variety of bitrates, while unencrypted content may be stored only at a low bitrate, or at all but the highest bitrate. In some embodiments, the content files contain chunks of data, where each chunk represents a portion of audio and video data. In some embodiments, encrypted content files and unencrypted content files have the same duration chunks (i.e., the chunks represent a consistent amount of audio and video data, for example, two seconds). To transition between unencrypted content and encrypted content, the endpoint device 108 switches from playing a chunk of unencrypted data to playing a chunk of encrypted data. For example, the endpoint device 108 plays a chunk of unencrypted data and then plays a chunk of encrypted data for the portion of video and audio data immediately after the chunk of encrypted data.

In some embodiments, endpoint device 108 fetches metadata and/or stream headers for files including encrypted content, decrypted content, or for a consolidated file, prior to a user requesting to the playback application 236 that a specific media title should be played. In such embodiments, playback application 236 determines that a user may be likely to request playback of a specific media title and playback application 236 thus transmits a request for metadata and/or stream headers for the files including content for the specific media title. In some embodiments, endpoint device 108 may fetch metadata and/or stream headers for unencrypted files prior to a user requesting playback of a specific media title, and may fetch metadata and/or stream headers for the encrypted files after a user requests playback of a specific media title. In other embodiments, endpoint device 108 fetches metadata and/or stream headers for files including encrypted content, unenecrypted content, or for a consolidated file prior to a user requesting playback of a specific media title to the playback application 236. In such embodiments, endpoint device 108 fetches metadata from control server 105 and/or fetches stream headers from CDN 102 both for files including encrypted content and for files including unencrypted content. In some embodiments, endpoint device 108 may fetch metadata and/or stream headers for encrypted files and for unencrypted files at the same time, while in other embodiments, endpoint device 108 may fetch metadata and/or stream headers for encrypted files at a different time than endpoint device 108 fetches metadata and/or stream headers for unencrypted files.

In some embodiments, endpoint device 108 may be configured to begin playback in the middle of a media title, rather at the end of a media title. In such embodiments, streaming media server 302 may store, within system disk 306, content files that include unencrypted content interspersed throughout the media title. When a user seeks to the middle of a content title, if the location to which the user seeks has unencrypted data, then endpoint device 108 may request from CDN 102 the unencrypted data at that location. If the endpoint device 108 has not yet obtained information for playback of encrypted content, then endpoint device 108 may request the information for playback of the encrypted content from control server 105 and DRM server 106 while the endpoint device 108 is playing the unencrypted data.

Figure 4:
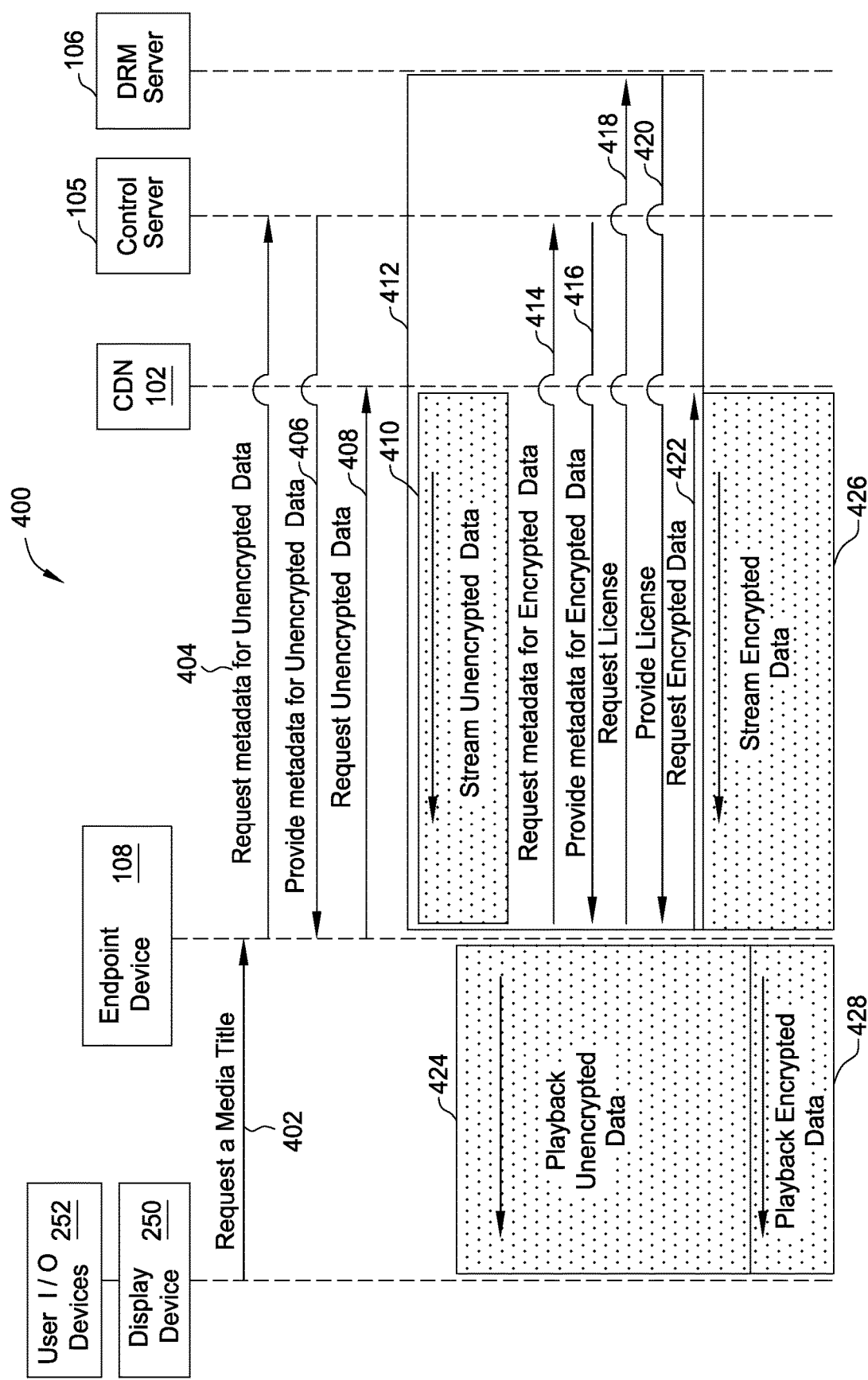
FIG. 4 is a sequence diagram depicting a first method for playing a media title, in which unencrypted content is stored in a different file than encrypted content, according to one embodiment of the present invention.

FIG. 4 is a sequence diagram depicting a first method 400 for playing a media title, in which unencrypted content is stored in a different file than encrypted content, according to one embodiment of the present invention. As shown, the method 400 begins at step 402, where a user, through the user I/O devices 252, requests playback of a media title. In response to the user's request, in step 404, the endpoint device 108 requests metadata for one or more files that include unencrypted data from the control server 105. In response to the request for metadata, in step 406, the control server 105 transmits metadata for one or more files that include unencrypted data to the endpoint device 108. When the endpoint device 108 receives the metadata for the unencrypted data, the endpoint device 108, in step 408, requests unencrypted data from the CDN 102. In response to the request for unencrypted data, in step 410, the CDN 102 streams unencrypted data to the endpoint device 108. In step 424, the endpoint device 108 begins playback of the unencrypted data for the user by providing video and audio data output to the user I/O devices 252 and display device 250. The time between when streaming first begins in step 410 and when endpoint device 108 begins playing back unencrypted data in step 424 represents the time required to download a sufficient amount of content information to begin playback and may be referred to as "buffering."

The CDN 102 streams the unencrypted data to the endpoint device 108 within contemporaneous block 412, which represents several contemporaneous steps. Steps 414, 416, 418, and 420 all occur while CDN 102 streams the unencrypted data to the endpoint device 108 in step 410. In step 414, the endpoint device 108 requests metadata for encrypted data from control server 105. In step 416, the control server 105 provides the metadata for the encrypted data to the endpoint device 108. In step 418, the endpoint device 108 requests a DRM license from the DRM server 106. In response to the request for the DRM license, the DRM server provides the DRM license to the endpoint device 108 in step 420. In step 422, the endpoint device 108 requests encrypted data from the CDN 102. In some embodiments, endpoint device 108 requests the first block in time that has not been received as part of the request for unencrypted data in step 410.

In step 426, the CDN 102 streams encrypted data to the endpoint device 108. When all of the unencrypted data has been played, in step 428, endpoint device 108 plays the encrypted data for the user. In some embodiments, the user is provided with an uninterrupted play back of video content. More specifically, endpoint device 108 transitions from unencrypted content to encrypted content when the endpoint device 108 receives the encrypted content and the DRM license. Streaming 426 and playback 428 may continue until the media title is finished playing, until the user requests that the media title stop playing, or until some other appropriate event.

Figure 5:
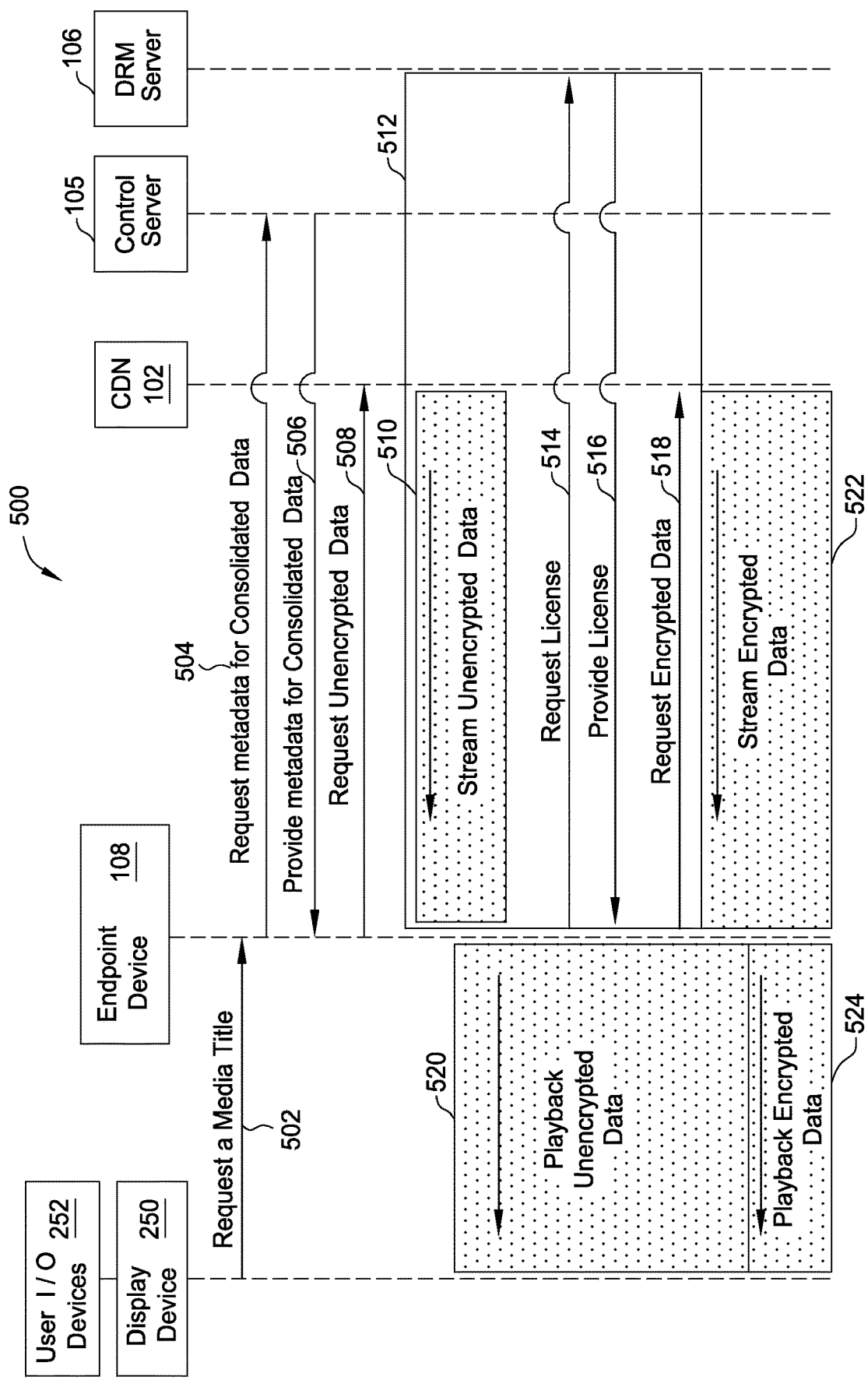
FIG. 5 is a sequence diagram depicting a second method for playing a media title, in which unencrypted content and encrypted content are stored in a consolidated file, according to one embodiment of the present invention.

FIG. 5 is a sequence diagram depicting a second method 500 for playing a media title, in which unencrypted content and encrypted content are stored in a consolidated file, according to one embodiment of the present invention. As shown, the method 500 begins at step 502, where a user, through the user I/O devices 252, requests playback of a media title. In response to the user's request, in step 504, the endpoint device 108 requests metadata for one or more files that include consolidated data from the control server 105. In response to the request for metadata, in step 506, the control server 105 transmits metadata for one or more files that include consolidated data to the endpoint device 108. When the endpoint device 108 receives the metadata for the consolidated data, the endpoint device 108, in step 508, requests unencrypted data within the one or more consolidated files pointed to by the metadata from the CDN 102. In response to the request for unencrypted data, in step 510, the CDN 102 streams unencrypted data to the endpoint device 108. In step 520, the endpoint device 108 begins playback of the unencrypted data for the user by providing video and audio data output to the user I/O devices 252 and display device 250. The time between when streaming first begins in step 510 and when endpoint device 108 begins playing back unencrypted data in step 520 represents the time required to download a sufficient amount of content information to begin playback (buffering).

The CDN 102 streams the unencrypted data to the endpoint device 108 within contemporaneous block 512, which represents several contemporaneous steps. Steps 514, 516, and 518 all occur while CDN 102 streams the unencrypted data to the endpoint device 108 in step 510. In step 514, the endpoint device 108 requests a DRM license from the DRM server 106. In response to the request for the DRM license, the DRM server provides the DRM license to the endpoint device 108 in step 516. In step 518, the endpoint device 108 requests encrypted data from the CDN 102.

In step 522, the CDN 102 streams encrypted data to the endpoint device 108. Because the unencrypted data and encrypted data are stored in a contiguous manner in a consolidated file, CDN 102 begins streaming the encrypted data after CDN 102 finishes streaming all of the unencrypted data in the consolidated file. In step 524, endpoint device plays the encrypted data for the user. Streaming 522 and playback 524 may continue until the media title is finished playing, until the user requests that the media title stop playing, or until some other appropriate event.

Figure 6:
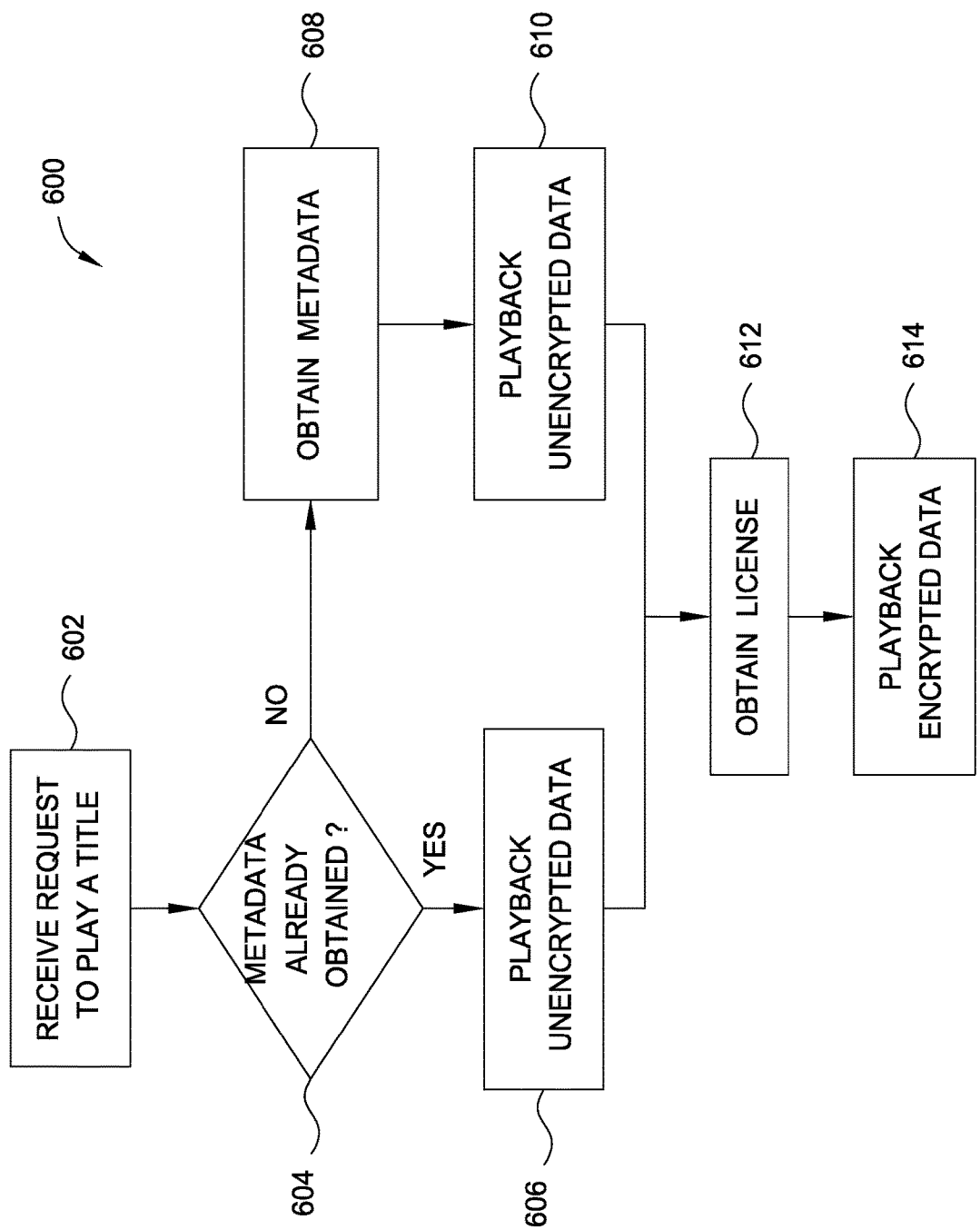
FIG. 6 is a flow diagram of method steps for initiating playback of a media title early, according to one embodiment of the present invention.

FIG. 6 is a flow diagram of method steps for initiating playback of a media title early, according to one embodiment of the present invention. Although the method steps are described in conjunctions with FIGS. 1-3, persons skilled in the art will understand that any system configured to perform the method steps, in any order, falls within the scope of the present invention.

The method 600 begins at step 602, where the endpoint device 108 receives a request from a user to play a media title. The user may indicate to the endpoint device 108 through user I/O devices 252, the request to play a specific media title. In step 604, endpoint device 108 determines whether metadata has already been obtained for the selected media title. The metadata may have been obtained prior to the user indicating a desire to view the selected media title, for example, when a user performs an action that indicates a likelihood that the user will select the media title. If the metadata has already been obtained, then in step 606, the endpoint device 108 obtains and plays the unencrypted data. The method 500 then proceeds to step 612.

Referring back to step 604, if the endpoint device 108 has not already obtained metadata for the selected media title, then in step 608, the endpoint device 108 obtains the metadata from the control server 105. In step 610, the endpoint device 108 obtains and plays the unencrypted data.

In step 612, the endpoint device 108 obtains a license from the DRM server 106, and obtains encrypted data. In step 614, the endpoint device 108 plays the encrypted data with the license.

Advantageously, embodiments of the invention provide techniques for streaming digital media content. One embodiment provides an endpoint device that retrieves and plays back unencrypted data, prior to receiving a license for decrypting encrypted data. While the unencrypted data is playing, the endpoint device transmits a request for a DRM license to a DRM server. Upon receiving a DRM license from the DRM server, the endpoint device plays encrypted data. Advantageously, the perceived delay between the time a user requests to play a digital media content title and the time playback of the digital media content title commences may be reduced at least in some cases.

One embodiment of the invention may be implemented as a program product stored on computer-readable storage media within the endpoint device 108. In this embodiment, the endpoint device 108 comprises an embedded computer platform such as a set top box. An alternative embodiment of the invention may be implemented as a program product that is downloaded to a memory within a computer system, for example as executable instructions embedded within an internet web site. In this embodiment, the endpoint device 108 comprises the computer system.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present invention is determined by the claims that follow.

What is claimed is:

1. A computer-implemented method for presenting content, comprising:
    prior to receiving a single user request to stream a media title, performing a first set of steps that includes:
        transmitting, at an endpoint device, a first request for first media metadata for a first file including unencrypted content of the media title to a control server, wherein the media title includes a first portion comprising the unencrypted content and a second portion comprising encrypted content, wherein the first media metadata includes location information for the first file, and wherein the control server determines that the endpoint device is authorized to play the media title prior to transmitting the first media metadata to the endpoint device; and
        transmitting, at the endpoint device, a second request for second media metadata for a second file including the encrypted content of the media title to the control server, wherein the second media metadata includes location information for the second file;
    receiving, at the endpoint device, the single user request to stream the media title after performing the first set of steps; and
    in response to receiving the single user request to stream, performing, at the endpoint device, a second set of steps that includes:
        transmitting, to a streaming media server, a request for the unencrypted content for the media title based on the first media metadata;
        streaming the unencrypted content for the media title;
        while streaming the unencrypted content,
            requesting a digital rights management (DRM) license to access the encrypted content for the media title,
            transmitting, to the streaming media server, a request for the encrypted content for the media title based on the second media metadata, and
            receiving, from the streaming media server, the encrypted content for the media title; and
        switching from streaming the unencrypted content for the media title to streaming the encrypted content for the media title upon completing streaming of all the unencrypted content.

2. The method of claim 1, wherein the first file is stored on the streaming media server and the second file is stored on the streaming media server, wherein transmitting the request for the unencrypted content comprises transmitting a request for the first file, and wherein transmitting the request for the encrypted content comprises transmitting a request for the second file.

3. One or more non-transitory computer-readable media including a program which, when executed by one or more processors, causes the one or more processors to perform the steps of:
    prior to receiving a single user request to stream a media title, performing a first set of steps that includes:
        transmitting, at an endpoint device, a first request for first media metadata for a first file including unencrypted content of the media title to a control server, wherein the media title includes a first portion comprising the unencrypted content and a second portion comprising encrypted content, wherein the first media metadata includes location information for the first file, and wherein the control server determines the endpoint device is authorized to play the media title prior to transmitting the first media metadata to the endpoint device; and
transmitting, at the endpoint device, a second request for second media metadata for a second file including the encrypted content of the media title to the control server, wherein the second media metadata includes location information for the second file;
receiving, at the endpoint device, the single user request to stream the media title after performing the first set of steps; and
in response to receiving the single user request to stream, performing, at the endpoint device, a second set of steps that includes:
transmitting, to a streaming media server, a request for the unencrypted content for the media title based on the first media metadata;
streaming the unencrypted content for the media title;
while streaming the unencrypted content,
requesting a digital rights management (DRM) license to access the encrypted content for the media title,
transmitting, to the streaming media server, a request for the encrypted content for the media title based on the second media metadata, and
receiving, from the streaming media server, the encrypted content for the media title; and
switching from streaming the unencrypted content for the media title to streaming the encrypted content for the media title upon completing streaming of all the unencrypted content.

4. The one or more non-transitory computer-readable media of claim 3, wherein the first file is stored on the streaming media server and the second file is stored on the streaming media server, wherein transmitting the request for the unencrypted content comprises transmitting a request for the first file, and wherein transmitting the request for the encrypted content further comprises transmitting a request for the second file.

5. A computing system comprising an endpoint device, the computing system comprising:
a memory including instructions; and
a processor that is coupled to the memory and, when executing the instructions, is configured to:
prior to receiving a single user request to stream a media title, performing a first set of steps that includes:
transmit a first request for first media metadata for a first file including unencrypted content of the media title to a control server, wherein the media title includes a first portion comprising the unencrypted content and a second portion comprising encrypted content, wherein the first media metadata includes location information for the first file, and wherein the control server determines the endpoint device is authorized to play the media title prior to transmitting the first media metadata to the endpoint device; and
transmit a second request for second media metadata for a second file including the encrypted content of the media title to the control server, wherein the second media metadata includes location information for the second file;
receive the single user request to stream the media title after performing the first set of steps; and
in response to receiving the single user request to stream, perform a second set of steps that includes:
transmitting, to a streaming media server, a request for the unencrypted content for the media title based on the first media metadata;
streaming the unencrypted content for the media title;
while streaming the unencrypted content,
requesting a digital rights management (DRM) license to access the encrypted content for the media title,
transmitting, to the streaming media server, a request for the encrypted content for the media title based on the second media metadata, and
receiving, from the streaming media server, the encrypted content for the media title; and
switching from streaming the unencrypted content for the media title to streaming the encrypted content for the media title upon completing streaming of all the unencrypted content.

6. The computing system of claim 5, wherein the first file is stored on the streaming media server and the second file is stored on the streaming media server, wherein transmitting the request for the unencrypted content comprises transmitting a request for the first file, and wherein transmitting the request for the encrypted content comprises transmitting a request for the second file.

7. The method of claim 1, further comprising, after receiving the DRM license, decrypting downloaded encrypted content for streaming the encrypted content.

8. The method of claim 1, wherein the control server determines the endpoint device is authorized to play the media title prior to transmitting the first media metadata by determining that a number of streams currently being transmitted to the endpoint device does not exceed a certain limit.

9. The method of claim 1, wherein the control server determines the endpoint device is authorized to play the media title prior to transmitting the first media metadata by performing a check to determine whether a content player associated with the endpoint device is out of window.

10. The method of claim 1, wherein the first media metadata further includes one or more media attributes associated with the media title, the one or more media attributes comprising at least one of a resolution, a bit rate, a number of audio channels, subtitle information, an aspect ratio, or a codec associated with the media title.

11. The method of claim 1, wherein the media title comprises a plurality of chunks of video and audio data, and the first media metadata specifies locations of a set of chunks included in the plurality of chunks that correspond to the unencrypted content.

12. The method of claim 1, wherein the first set of steps is performed in response to a first user action associated with the media title.

13. The method of claim 1, wherein:
the media title comprises a plurality of chunks of video and audio data;
the request for the encrypted content specifies a first chunk included in the plurality of chunks that has not been received as part of the unencrypted content; and
the request for the encrypted content for the media title is separate from the request for the unencrypted content for the media title.

14. The method of claim 1, wherein the unencrypted content received from the streaming media server comprises a predetermined amount of unencrypted content.

\* \* \* \* \*

UNITED STATES PATENT AND TRADEMARK OFFICE
CERTIFICATE OF CORRECTION

| | | |
|---|---|---|
| PATENT NO. | : 11,349,699 B2 | |
| APPLICATION NO. | : 13/838059 | |
| DATED | : May 31, 2022 | |
| INVENTOR(S) | : Watson et al. | |

It is certified that error appears in the above-identified patent and that said Letters Patent is hereby corrected as shown below:

In the Claims

Column 13, Claim 4, Line 42, please delete "further".

Signed and Sealed this
Second Day of August, 2022

Katherine Kelly Vidal
*Director of the United States Patent and Trademark Office*